United States Patent [19]

Davies et al.

[11] 4,054,373

[45] Oct. 18, 1977

[54] MICROFORM VIEWER

[76] Inventors: George Davies; Hedda Wertheimer, both of 8 Duhamel Place, Jersey, Channel Islands, England

[21] Appl. No.: 658,751

[22] Filed: Feb. 17, 1976

[30] Foreign Application Priority Data

Feb. 17, 1975 United Kingdom .................. 6599/75

[51] Int. Cl.² ............................................ G02B 27/04
[52] U.S. Cl. .................................... 350/241; 350/247; 350/250
[58] Field of Search ............... 350/235, 247, 238, 239, 350/240, 241, 243, 244, 245, 250, 251; 248/441 R, 441 A, 444, 451–453, 457; 40/106.1

[56] References Cited

U.S. PATENT DOCUMENTS

| 1,568,148 | 1/1926 | Fiske | 350/240 |
| 1,742,640 | 1/1930 | Fiske | 350/239 |
| 2,127,771 | 8/1938 | Baldauf | 350/241 |
| 2,604,009 | 7/1952 | Walrath | 350/241 |
| 3,000,123 | 9/1961 | Hicks | 350/235 X |

Primary Examiner—F. L. Evans
Attorney, Agent, or Firm—Oblon, Fisher, Spivak, McClelland & Maier

[57] ABSTRACT

This invention is a portable hand operated viewer for micro-fiches and other material with writing too small to be read by the unaided eye. A translucent table has a clamp for the reading matter and that carries an adjustable binocular lens unit, with a head piece for correct location and for movement to scan the table. It is cheap and can be assembled by a child and is suitable for use in schools.

9 Claims, 5 Drawing Figures

MICROFORM VIEWER

BACKGROUND OF THE INVENTION

This invention relates to viewers for example enabling a user to read through lenses matter for example micro-film which is too small to be read conveniently with the naked eye.

An object of the present invention is to provide a design of viewer which avoids the disadvantages of known viewers in that it is difficult to maintain them steady with the correct spacing between the lenses and the object and the eye and the lenses, and without mechanical vibration.

SUMMARY OF THE INVENTION

According to the invention a viewer comprises a base, a table on the base for supporting material to be viewed and a lens unit adapted to be mounted on the base or table.

The base may be mounted on some rigid horizontal surface or on the user's chest, being steadied by one or both hands and conveniently there is a head rest on the lens unit against which he can rest his forehead to ensure that all components can be easily maintained in the desired relative position.

In general the viewer will have adjustment of the positions of the various components to suit the particular application. Thus there may be an adjustment of the spacing between the two lenses in a binocular arrangement to suit the spacing between the user's eyes; there may be an adjustment of the distance of the lenses from the table; there may be an adjustment of the side to side position of the lens unit in relation to the table; there may be an adjustment of the position of the material to be viewed on the table and/or of the position of the lens unit on the table.

In one preferred form of the invention the base and table are arranged for relative pivoting about a transverse hinge from a position in which the base and table are flat together for compact storage when not in use and a position in which the table is in a plane at an angle of greater than 180° from the front face of the base.

BRIEF DESCRIPTION OF THE DRAWINGS

The invention may be carried into practice in various ways and one embodiment will now be described by way of example with reference to the accompanying drawings, in which.

DESCRIPTION OF THE PREFERRED EMBODIMENTS

Figure 1:
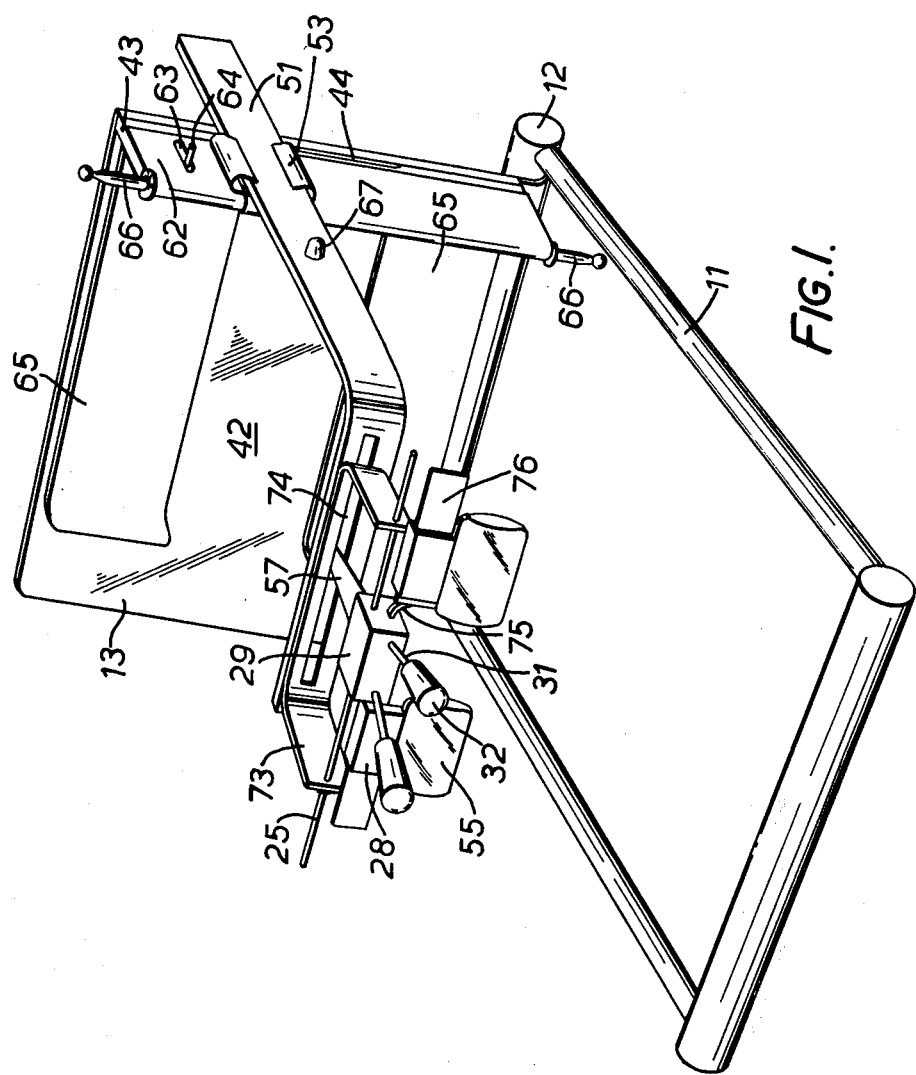
FIG. 1 is a perspective sketch of a veiwer.

The viewer comprises a base 11 in the form of a rectangular frame having a transverse bar-like component 12 which can pivot from the stowed position flat against the base 11 to the reading position shown in the FIG. 1. The table is rectangular and of translucent opal acrylic material, so that any transparent sample to be observed such as microfilm, can be illuminated from behind the table. A hinged metal reflector 61 is suitably attached to the back of the table 13, spanning nearly its entire width, to reflect light and so illuminate any transparencies being viewed.

A side member 43 is situated along one side of the table which has a slot 44 where it joins the table. A metal clip 62 is located on the side member 43 along its entire length. The clip 62 has a small channel 63 cut in it near the top, through which extends a small pin 64 attached to the side member. This allows limited movement of the clip relative to the side member.

Two sprung metal plates 65 are attached to the clip 62 and extend across the table, one at the top, one at the bottom, serving as clamps for any reading material on the table and as clamps for any reading material on the table and as masks to cut out unwanted images. The two plates 65 leave a space 42 between them which corresponds in position with the slot 44 in the side member. Thus a strip of 35mm film can pass along the space 42 and through the slot 44.

The side member and clip are equipped with two handles 66 which are joined by a length of flexible tubing running the length of the side member between the side member and the clip. By movement of the inner ends of these handles towards the plane of the table, the clip may be levered away from the table leaving a gap behind the metal clamps 65 which can accommodate material to be viewed. Once this material has been located, the application of pressure to the clip at the center of its length will return it to its former position thus clamping the material to be viewed.

Figure 3:
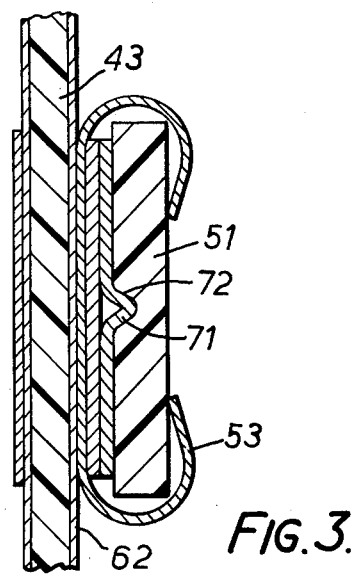
FIG. 3 is a vertical section through the clamp 53 of FIG. 1.
Figure 4:
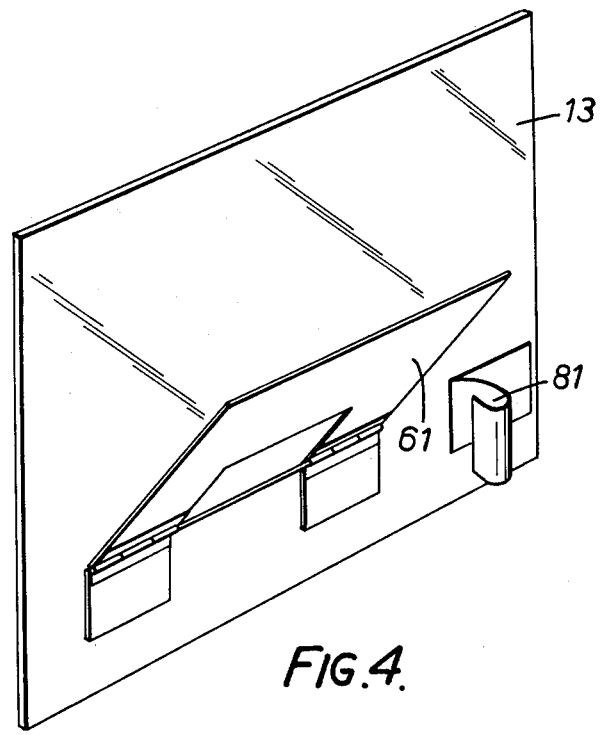
FIG. 4 is a perspective view of the back of the table.

A lens unit is mounted on an "L" shaped member 51 formed from acrylic material. One part of the member 51 is adjustably secured to the table by means of a clamp 53 which is attached to the clip 62. As shown in FIG. 3, this part is slidably located in the clamp, so that the position of the lens unit can be adjusted manually, using a knob 67 on the "L" shaped member to bring the lenses into focus. The clamp 53 is of spring metal, folded over so that its ends press inwards on the "L" shaped member 51. To hold the "L" shaped member in position vertically, a metal ridge 71 is formed along the center of the inner surface of the clamp 53, which is located in a channel 72 formed in the "L" shaped member. Once the lenses have been focussed they will remain in focus regardless of the thickness of the sample to be viewed thereafter, since the lens unit is attached, through the member 51, to the clip 62 whose position is dependent upon the thickness of the sample.

The lens unit is attached to the other part of the member 51 by means of a bearing unit 73, which is suitably attached to the member 51. The bearing unit 73 is of plastics material and is "U" shaped with a bearing at each of its ends, in which bearings a lens-adjusting rod 25 is free to slide. There is a slot 74 in the flat rear portion of the unit 73, which corresponds with a similar slot in the "L" shaped member 51.

A rubber block 29 embraces a "U" shaped metal bar 75 and an adjusting rod 25 which can slide along the block 29 against frictional resistance. On either side of the block two metal plates 76 are welded to the bar 75, and on each plate a sleeve 27 is slidably mounted. Each sleeve 27 forms a lens holder 28 which carries a lens 55. Thus the sleeves 27 can be set along the plates 76 a distance apart corresponding to that of the user's eyes and then as the material is read the complete rod and lens assembly can be slid from side to side to bring it into line with any selected part of the material.

An image separating mask (not shown) of opaque material can be placed between the lenses 55 with the dual purpose of separating the images and cutting out interference of the images by undesired print.

The central block 29 carries a pair of pins 31 each of which has on its upper end a soft rubber knob 32 constituting a head stop against which the user can rest his fore-head with his eyes at the preferred position from the lens, and by means of which the lateral position of the lens unit can be adjusted by movement of the head, scanning the image as one would in normal reading. The knob height can be adjusted as required.

The block 29 also carries a guide 57 which extends through the slot 74 in the bearing unit 73 and the "L" shaped member 51 and which helps to keep the lens unit in the correct plane as it moves from side to side.

Thus in use the base 11 can be rested against the chest and supported by one hand on the hinge 12 while the user's fore-head rests against the stops 32. Once the adjustments have all been set to suit that user and the material for reading, the relative positions of all the components can be retained without substantial mechanical vibrations so that reading is very easy.

A metal clip 81 is attached to the back of the table 13 which can accommodate the "L" shaped member 51. When the viewer is dismantled for storage or travel the member 51 carrying the lens unit, is removed from the clamp 53 and the lenses are folded flat by rotation of the bar 75 in the block 29. The member 51 is then located in the clip 81 and the viewer is folded flat.

Figure 2A:
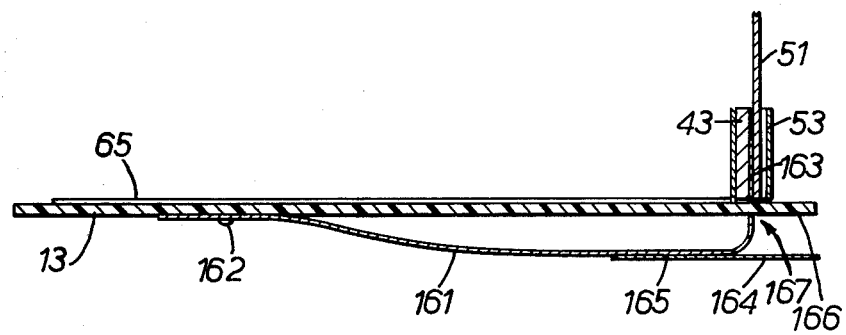
FIG. 2A is a simplified section through a second embodiment of the table showing the clamping mechanism closed.
Figure 2B:
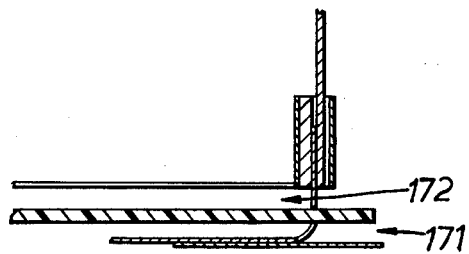
FIG. 2B is a simplified part-section similar to FIG. 2A showing the clamping mechanism open.

A second embodiment of the table shown in FIGS. 2A and 2B differs from the first embodiment only in the clamping mechanism and in the relationship between the table 13 and the side member 43. There is incorporated a clamping mechanism which holds a page or book in place on the table down one side, preferably the right. The clip 62 and the associated levering handles 66 are not required, the clamps 65 being directly attached to the side member 63.

In this case, a sprung metal plate 161 is attached to the table 13 at 162 and is attached to the side member 43 at 163. The sprung metal plate acts to keep the table and side member in close contact as they are not directly attached to one another. A window, is cut in the plate 161 to allow light to the table when viewing transparencies. A metal strip 164 is attached to the sprung plate 161 at 165 and the table 13 has a protruding central tab 166 which extends through a slot in the sprung plate indicated generally at 167.

When the strip 164 and the tab 166 are pressed together as shown at 171 in FIG. 2B against the force of the sprung plate 161, a gap 172 is formed along the edge of the table 13 between the table and the side member 43. The page or book to be read is then placed with its edge in the gap 172, the strip 164 and tab 166 are released and the sprung plate brings the side member 43 and table 13 back together, clamping the page or book in place.

The lenses and this device as a whole are designed to suit a 35 mm film frame. Since the optimum reduction of average text is from A3 original to a 35 mm frame, the device will scan a sheet of A3 original both vertically and horizontally with little distortion.

In a further embodiment of the viewer the "L" shaped member 51 is replaced by two lens holding bars which slide on two runners situated one either side of the table. The runners are free to move vertically and are propelled by the nose, upwards against gravity and downwards by gravity. Thus the lenses are able to scan vertically as well as horizontally.

The equipment is quite simple to manufacture and adjustment is also very simple.

It will be seen that the lenses perform three functions. They magnify the printed object, they give a stereoscopic effect, and they can be designed to suit the individual reader, for example by correcting for astigmatism, in that in using the viewer the reader does not need the glasses he might have to wear normally.

The lenses could be bifocal lenses with two fields of view, one above the other in the vertical direction of the printed matter so that the reader can scan vertically by looking through a different part of each lens.

Obviously, numerous modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. A viewer comprising a base, a table pivotally mounted on the base, clamp means for temporarily gripping matter to be viewed on the table, a lens unit including a lens for viewing the matter mounted on the clamp means, the lens being adjustably positioned on the lens unit, and the lens unit being laterally adjustable in relation to the clamp means, and a head rest extending from the lens unit above the lens towards the user including means for enabling the user to move the lens unit laterally by pressure of his head on the head rest.

2. A viewer as claimed in claim 1 in which the lens unit includes two lenses with an adjustable spacing between them to suit the eyes of the user.

3. A viewer as claimed in claim 1 in which the base and table are arranged for relative pivoting about a transverse hinge from a position in which the base and table are flat together and a position in which the table is in a plane at an angle of greater than 180° from the front face of the base.

4. A viewer as claimed in claim 3 in which the clamp means includes a mask for material not to be viewed through the lenses.

5. A viewer as claimed in claim 1 in which the clamp means is spring loaded.

6. A viewer as claimed in claim 1 in which the table is translucent to enable material to be viewed to be illuminated from the rear.

7. A viewer as claimed in claim 1 which includes a hinged reflecting surface to reflect light onto the rear of the table.

8. A viewer as claimed in claim 1 including a post on the table, the lens unit being mounted on the post, the adjustment means for enabling the height of the lens unit above the table to be set.

9. A viewer as claimed in claim 8 including a transversely-extending member on the post, the lens unit being slidably mounted on the transversely-extending member, the head rest comprising a pair of transversely-spaced pins, each pin carrying a knob for the user's forehead.

* * * * *

UNITED STATES PATENT AND TRADEMARK OFFICE
CERTIFICATE OF CORRECTION

PATENT NO. : 4,054,373
DATED : October 18, 1977
INVENTOR(S) : George Davies, Hedda Wertheimer It is certified that error appears in the above-identified patent and that said Letters Patent are hereby corrected as shown below:

Under [30] Foreign Application Priority Data

Please add the following:

--Dec. 11, 1975 United Kingdom ....6599/75--

Signed and Sealed this

Fifteenth Day of May 1979

[SEAL]

Attest:

RUTH C. MASON
Attesting Officer

DONALD W. BANNER
Commissioner of Patents and Trademarks